July 26, 1949.  A. W. BEAN  2,477,229

TOOL BAR ASSEMBLY FOR AGRICULTURAL PURPOSES

Filed Feb. 15, 1946

ARTHUR WILLIAM BEAN
Inventor

By Richardson David & Jordan
his Attorneys.

Patented July 26, 1949

2,477,229

UNITED STATES PATENT OFFICE 2,477,229

TOOL BAR ASSEMBLY FOR AGRICULTURAL PURPOSES

Arthur William Bean, Brough, England

Application February 15, 1946, Serial No. 647,742
In Great Britain May 31, 1944

Section 1, Public Law 690, August 8, 1946
Patent expires May 31, 1964

3 Claims. (Cl. 97—164)

This invention relates to tool bar assemblies for agricultural purposes, that is to say to arrangements for supporting cultivating implements on tractors and other wheeled appliances.

Tool bars for the purpose in question are well known but suffer many disadvantages primarily because it is a lengthy and sometimes difficult operation to adjust the tool assembly to alter the spacing of the tool or adjust the depth of penetration into the soil. At present it is necessary to stop the tractor or other vehicle to adjust the depth of penetration of the implements and to adjust the positions of the implements involves slackening and tightening numerous nuts and bolts which may be difficult and is frequently a tedious operation.

The principal object of the present invention is to provide an improved tool bar assembly which is such that the spacing of the tools thereon may be varied simply and quickly.

A further object of the invention is to provide a tool bar assembly in which the depth of penetration of the implements into the soil may rapidly be varied and adjusted even whilst the tractor or other wheeled vehicle carrying the bar is in motion.

According to the present invention the tool bar comprises a round bar having throughout the whole or the greater part of its length peripheral parallel grooves and each tool is mounted on a sleeve having a spring loaded member acting through an aperture in the sleeve to engage one of the grooves to determine its position axially along the bar.

There may be any desired number of tools mounted on the tool bar and each tool is carried by its individual sleeve to be located in a desired positional relationship along the length of the tool by the engagement of its spring loaded members in a groove in the tool bar at the desired position. It is therefore a simple matter to adjust the position of a tool by displacing its spring loaded member and, after axial displacement of the sleeve, re-engage it in a groove in the adjusted position of the sleeve.

Further according to the present invention a pivoted frame has its main members extending parallel with the tool bar, springs are provided between the ends of the implement carrying members or extensions thereof and one of the main members, and means are provided for adjusting the angular position of the frame to adjust the penetration of the implements determined by their carrying members engaging the one frame member under the action of the springs connected to the other frame member. The angular position of the frame may be varied in any convenient manner as by attaching it to an operating lever having a manually operable spring loaded pawl engageable with the teeth of a quadrant.

In order that the invention may be clearly understood and readily carried into effect, the same is hereinafter more fully described with reference to the accompanying drawings which are given for purposes of illustration only and not of limitation.

In these drawings—

Figure 1:
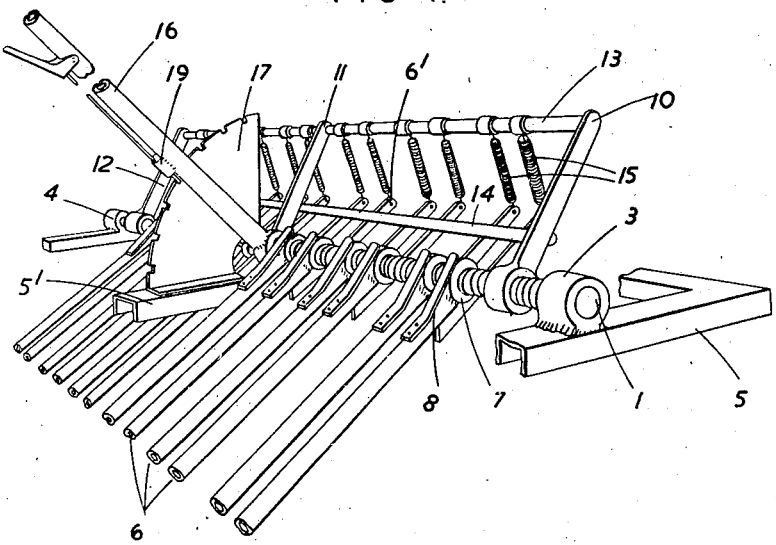
Figure 1 is a perspective view of the tool bar assembly showing a number of implement carrying arms mounted thereon and the means for adjusting the depth of penetration of the cultivating implements.
Figure 2:
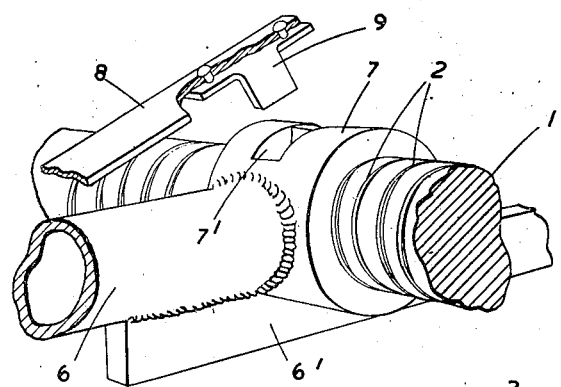
Figure 2 is a perspective detail view on an enlarged scale showing the sleeve portion of an implement carrying arm and its connection means which engage with the tool bar.

Referring now to the said drawings, in which like parts bear like reference numerals, and in particular to Figures 1 and 2 thereof, a tool bar 1 of any desired length and any convenient diameter has peripheral grooves 2 provided throughout the whole or greater part of its length. The grooves are cut to any convenient depth and are spaced desirably regularly at short intervals. The tool bar 1 is supported at its ends in suitable holding brackets 3, 4 made fast to a metal frame-work 5 on or carried by a tractor or other wheeled vehicle. The tool bar may also be supported at its middle or at one or more intermediate points, for example on an intermediate member $5^1$ of the frame-work 5. The tool bar 1 is held non-rotatably in its supporting brackets 3, 4 conveniently by grub screws extending therethrough to engage the bar itself. It will be understood, therefore, that the tool bar is quite readily separable from its supporting brackets.

Each tool carrying member, conveniently in the form of a metal tube 6 with a metal bar extension member $6^1$, is made fast to a sleeve 7 as by welding, and the bore in the sleeve 7 is large enough to receive the tool bar 1 whilst the length of the sleeve is sufficient to obtain a good bearing on the tool bar against swinging movement. On each member 6 is a spring loaded member which is adapted to extend through the sleeve 7 to engage with one of the grooves 2 in the tool bar 1. Each member 6 is, therefore, freely rotatable about the tool bar 1 but axial movement is prevented by the part 9 engaging in a groove 2.

As illustrated in Figure 2 the spring loaded member comprises an element 9 which is carried at the end of a leaf spring 8 mounted on the tube 6. A radial slot $7^1$ is provided in the sleeve 7 through which the element 9 may extend to engage with the grooves in the tool bar 1.

Figure 3:
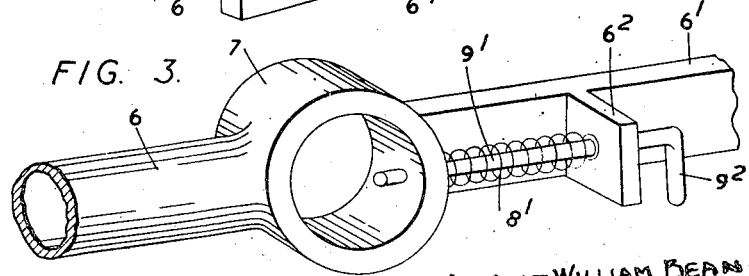
Figure 3 is also a perspective view on an enlarged scale showing the sleeve portion of an implement carrying arm with alternative means for connecting the same to the bar.

In an alternative construction as illustrated in Figure 3, the spring loaded member comprises a bolt $9^1$ which extends through the sleeve 7 substantially as illustrated and has a cranked end $9^2$ beyond a bearing lug $6^2$ on the bar extension member $6^1$ of the implement carrying member 6. A coil spring $8^1$ is provided between the lug $6^2$ and a collar (not shown) fast on the bolt $9^1$ to urge the end of the bolt in groove engaging direction. The bolt $9^1$ may easily be retracted by taking hold of its cranked end $9^2$.

Also rotatable on the tool bar 1 (see Figure 1) is a number of radial arms 10, 11, 12 connected together at their free ends by a main frame member 13 and at a point intermediate their length by another frame member 14 parallel with the member 13 and parallel also with the tool bar 1; the parts 10, 11, 12 and 13, 14 forming a rigid frame. The extension member $6^1$ extends to the opposite side of the pivotal axis to the tube 6 and a spring 15 connects the free end of each extension $6^1$ with the member 13. The action of the springs 15 is to tend to rotate the implement carrying members 6 so that the cultivating implements carried at their ends will penetrate into the ground, the depth of penetration being limited when the extensions $6^1$ contact the member 14. One of the radial arms, for example the radial arm 11 has a radially extending handle 16 made fast to its boss so as to extend at an angle to the arm 11. The handle 16 is movable adjacent a square toothed quadrant 17 and carries a manually operable spring loaded pawl 19 adapted to engage one of the teeth of the quadrant to lock the radial arms 10, 11, 12 in a particular angular relationship to give a particular depth of penetration into the ground to the implements carried on the ends of the members 6. The arrangement is desirably such that when the handle 16 is in its more or less vertical limit position the bar 14 acting on the extensions $6^1$ will rock the member 6 to lift the implements carried thereby out of contact with the ground.

The arms 10, 11, 12 may extend to opposite sides of the pivotal axis when the limiting bar 14 may be on the opposite side of the tool bar to the spring carrying bar 13 with equal effect. Whilst it is preferred to use the grooved tool bar with its radially adjustable implement carrying sleeve members with the depth of penetration regulating means described above, the same may, of course, be used with other means for regulating the depth of penetration of the implements and for urging the implements into the ground or even without the provision of such means.

I claim:

1. A tool bar assembly for supporting cultivating implements on agricultural machinery comprising a bar having spaced peripheral grooves thereon, spaced sleeves rotatable on said bar and an implement carrying member fixed to each sleeve on one side of the bar and having an extension projecting on the other side of the bar, a spring loaded detent fixed to each member for engaging the groove adjacent said sleeve to position said member axially on said bar; a frame pivoted to said bar and having inner and outer rods parallel to said bar, spring means connecting the outer rod with the adjacent ends of the implement carrying extension, the inner rod lying above the extension so as to engage the same when the frame is rocked on its pivot, means for rocking the frame so that when it is tilted in one direction the springs urge the implement carrying members downwardly, and when it is tilted in the opposite direction, the inner bar urges said members upwardly, and means for locking said frame in any desired position.

2. A device according to claim 1 in which the sleeve is provided with an opening and the detent extends into said opening to engage the groove in the bar.

3. A device according to claim 1 in which a quadrant is supported on the agricultural machine and a control lever is fixed to said frame adjacent said quadrant, said lever having a pawl engageable with said quadrant to fix said frame in its adjusted positions.

ARTHUR WILLIAM BEAN.

REFERENCES CITED

The following references are of record in the file of this patent:

UNITED STATES PATENTS

| Number | Name | Date |
| --- | --- | --- |
| 350,036 | Brown et al. | Sept. 28, 1886 |
| 360,714 | Miles et al. | Apr. 5, 1887 |
| 721,335 | Smethers | Feb. 24, 1903 |
| 770,372 | Lake et al. | Sept. 20, 1904 |
| 1,645,457 | Schall | Oct. 11, 1927 |
| 1,732,081 | Clement | Oct. 15, 1929 |